Dec. 7, 1926.
G. C. FELDMAN
1,610,081
LUGGAGE CARRIER FOR CLOSED CARS
Filed Sept. 24, 1924
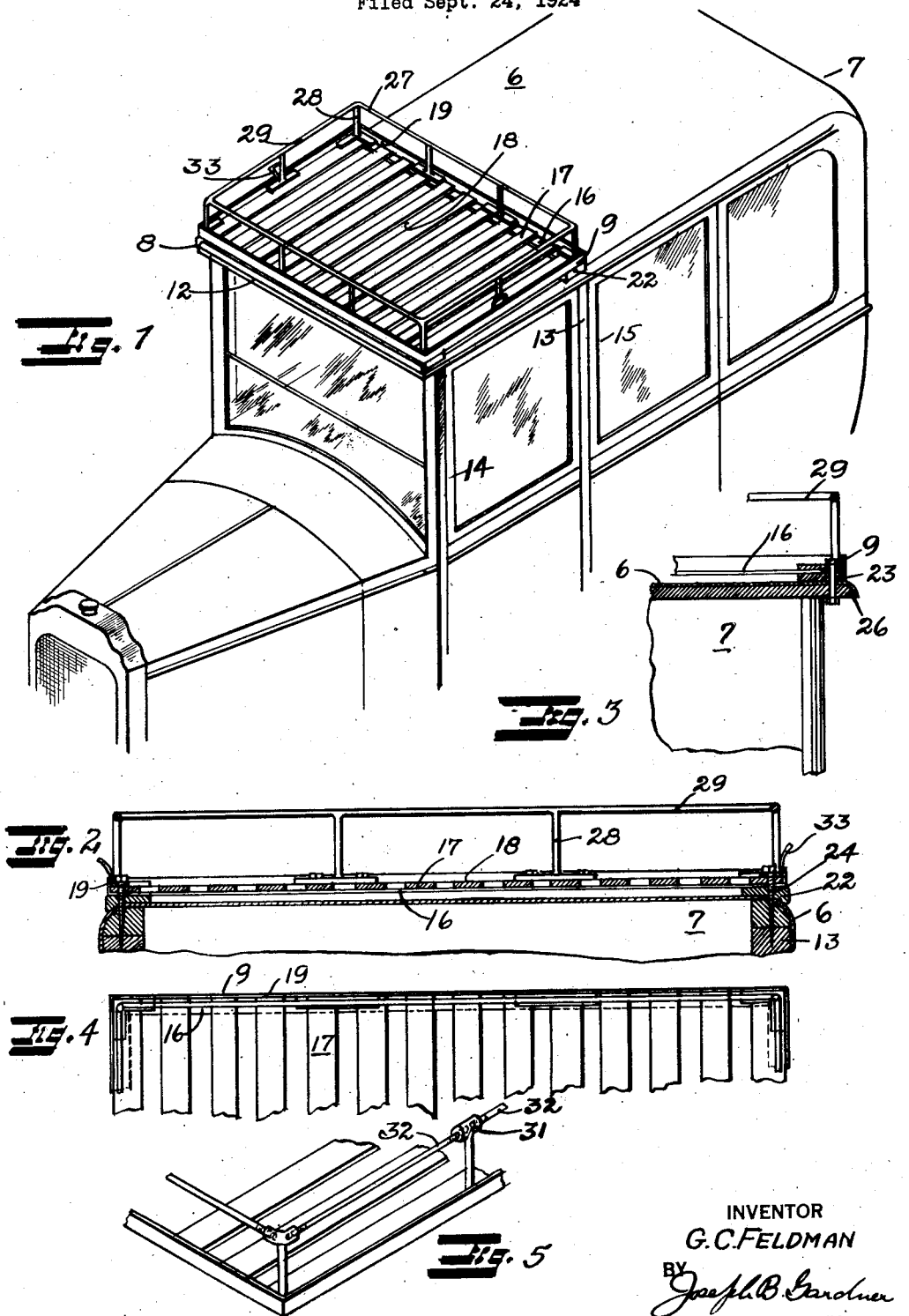
INVENTOR
G.C.FELDMAN
BY
ATTORNEY Patented Dec. 7, 1926.

1,610,081

UNITED STATES PATENT OFFICE.

GEORGE C. FELDMAN, OF OAKLAND, CALIFORNIA.

LUGGAGE CARRIER FOR CLOSED CARS.

Application filed September 24, 1924. Serial No. 739,569.

My invention relates to the type of automobile luggage carriers which permit of the luggage being carried over the roof of automobiles of the closed type.

An object of the invention is to provide a carrier of the character described which will relieve the central portion of the roof of the automobile from the weight of the luggage.

Another object of the invention is to provide a carrier of the type described which may be handled in its entirety as a single unit.

A further object of the invention is to provide a carrier with the foregoing advantages, which is extremely simple in construction, well appearing when in use, and readily removed from or replaced on the automobile.

The invention possesses other objects and features of advantages, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings:

Figure 1 is a perspective view of the carrier of my invention showing it positioned on an automobile.

Figure 2 is a vertical sectional view of the carrier and top of the automobile showing how the carrier is secured to the automobile adjacent the rear end of the carrier.

Figure 3 is a fragmentary vertical sectional view of the carrier and top of the automobile, taken at right angles to the section shown in Figure 2, showing how the carrier is secured to the automobile at the front.

Figure 4 is a plan view of the rear portion of the carrier.

Figure 5 is a perspective view of a corner portion of a carrier of slightly modified construction.

Automobile luggage carriers of the type to which the present invention is related have heretofore been, in so far as I am aware, made a built-in or at least a permanent fixture of the automobile. In accordance, however, with my invention, the carrier is in the nature of a unit which may be readily placed on a car at any time or easily removed therefrom whenever desired. Furthermore, this type of carrier, as heretofore constructed, involved the use of the central portion of the car roof as the support for the luggage thereby causing a considerable strain on the roof structure and a consequent necessity for unduly reinforcing the latter or unduly limiting the amount of luggage or baggage which may be carried. With the carrier as I make it, the weight of the luggage, as well as that of the carrier, are transmitted practically entirely directly to the frame members of the automobile body thus relieving the central portion of the roof from substantially all load carrying strain.

As illustrated in the embodiment of the invention shown in Figures 1 to 4 of the drawings, the carrier is arranged to be positioned on the roof 6 of the automobile top 7 adjacent the forward end portion 8, and comprises a rectangular frame 9 which is preferably formed of angle iron and is large enough in one direction to extend from side to side of the top and in the other direction to extend from the forward edge 12 of the roof to a point over the pillar posts 13. It will thus be noted that the frame overlies a set of forwardly disposed pillar posts 14 and a rearwardly disposed set 15 which includes the posts 13. Arranged in the frame and suitably secured to the horizontal flange 16 of the frame are a plurality of relatively inflexible panels 17 which form a platform 18 upon which luggage or other articles may be placed. It is to be noted that the vertical flange 19 of the frame extends upwardly from and lies outwardly of the horizontal flange thereby serving as a means of concealment of the latter, as well as the panels 17, when the carrier is viewed from a point below the top of the frame.

Arranged to be interposed between the frame and roof are a plurality of spacer members 21 and 22 which are positioned between the corner portions of the frame and the pillar posts of the respective sets 14 and 15. The members 21 and 22 serve to maintain the frame as well as the platform 18 spaced from the roof, and in this manner practically the entire weight of the carrier, as well as that of the articles set thereon, will be transmitted directly to the four posts under the spacers, or in other words, directly to the frame members of the automobile body.

Attachment of the carrier and spacers to the car is here shown effected by means of bolts 23 (Figure 3) and lag screws 24 (Figure 2). The bolts 23 are adapted to pass through and clamp together the flange 16, the spacer and the eave 26 at the forward extremity of the roof. The lag screws 24, like the bolts 23 are arranged to pass through the flange 16, a spacer, and into the roof, and in addition may extend well into the ends of the pillar posts. Should it be desired to remove the carrier, it is merely necessary to remove the screws 23 and bolts 24. After the carrier has been taken off the bolts and screws are preferably replaced, it being noted that the exposed portion of the screws and bolts are so relatively small that their presence will be practically unnoticeable.

Incorporated with the carrier is a railing 27 which completely encloses the platform and is secured to the frame. The railing is provided with spindles 28 which are preferably welded at their upper end to top rail 29 and bolted or otherwise secured at their lower extremities to the flange 16. In the embodiment shown in Figure 5 the upper extremities of the spindles are provided with threaded sockets 31 in which correspondingly threaded end portions of rail sections 32 are fitted.

Rings 33 are preferably provided at the sides of the frame through which may be passed a strap or the like for holding the luggage in the carrier.

I claim:—

1. A luggage carrier adapted for use on an automobile of the closed type and arranged to be positioned on the roof thereof between a set of forwardly and rearwardly disposed pillar posts, comprising a luggage carrier frame, and spacing members interposed between said frame, and each of said posts to maintain said frame spaced from said roof and thereby cause the weight of the frame and luggage thereon to be transmitted directly to said pillar posts.

2. A luggage carrier adapted for use on an automobile of the closed type and arranged to be positioned on the roof thereof over a set of forwardly and rearwardly disposed pillar posts, comprising a carrier unit including a frame, a rack, and a railing extending upwardly from around the edges of said rack, spacing members arranged to be interposed between said unit and said posts whereby the weight of said unit and the luggage thereon may be transmitted directly to said posts, and means for releasably securing said unit and spacing members to the automobile.

3. A luggage carrier adapted for use on an automobile of the closed type and arranged to be positioned on the roof thereof, comprising a carrier unit including a rack, and means for releasably securing said unit spaced from and in position over the roof.

4. A luggage carrier adapted for use on an automobile of the closed type and arranged to be positioned on the roof thereof over a set of forwardly and rearwardly disposed pillar posts, comprising a luggage carrier unit including a frame, a rack, and a railing adjacent the edges of said rack, spacing members arranged between said unit and said posts adapted to maintain the same substantially spaced from said roof, and means passing through said spacers for securing said unit in position.

5. A luggage carrier adapted for use on an automobile of the closed type and arranged to be positioned on the roof thereof over a set of forwardly and rearwardly disposed pillar posts, comprising a rectangular frame member substantially of the width of said roof and of a length in excess of the distance between said forwardly and rearwardly disposed posts, a luggage supporting platform carried by said frame, a railing fixed to said frame and extending upwardly therefrom to define an enclosure for said platform, spacers arranged to be interposed between said posts and frame to space said platform from said roof, and means for securing said frame and spacers in position.

6. A luggage carrier adapted for use on an automobile of the closed type and arranged to be positioned on the roof thereof over a set of forwardly and rearwardly disposed pillar posts, comprising a luggage carrier unit, and spacing members adapted to be secured to said carrier and to the roof and arranged to be interposed between said unit and said posts.

In testimony whereof, I have hereunto set my hand at Oakland, California, this 29th day of August, 1924.

GEORGE C. FELDMAN.